Figure 3:
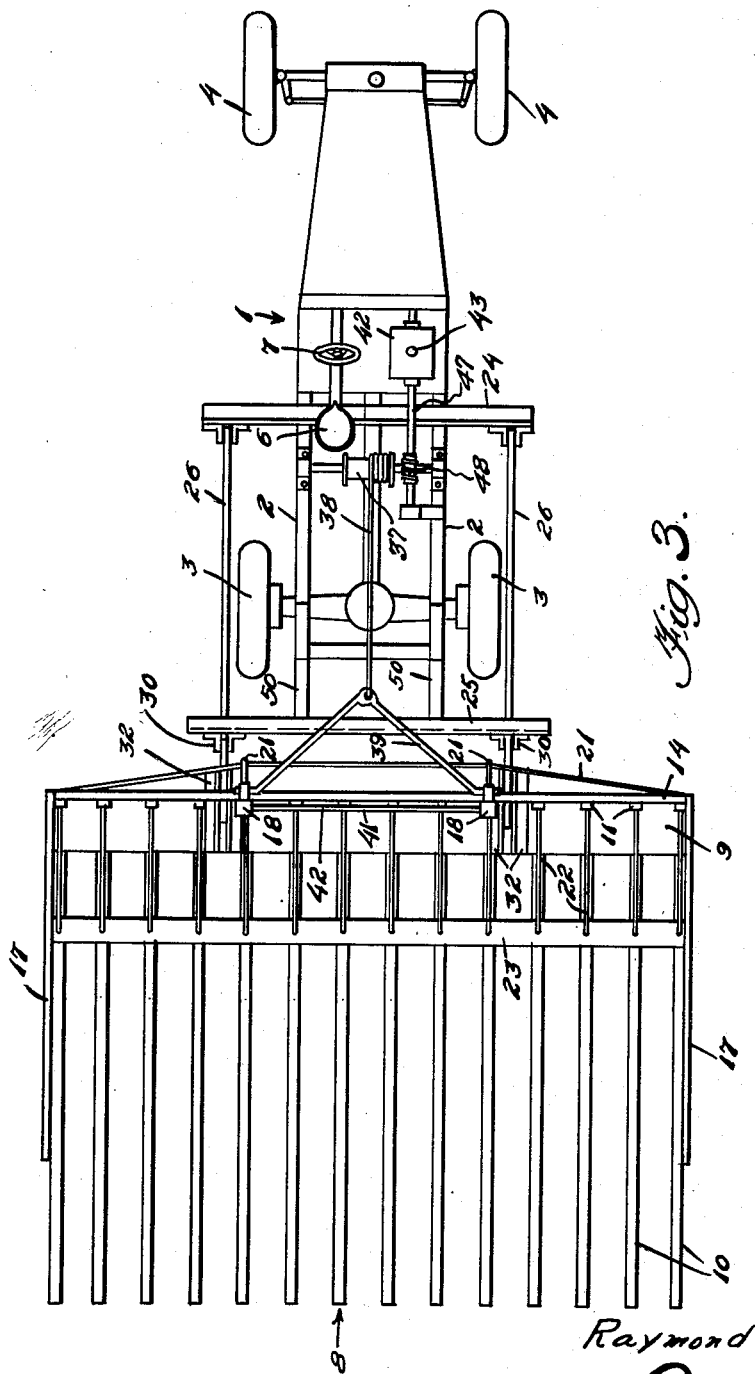

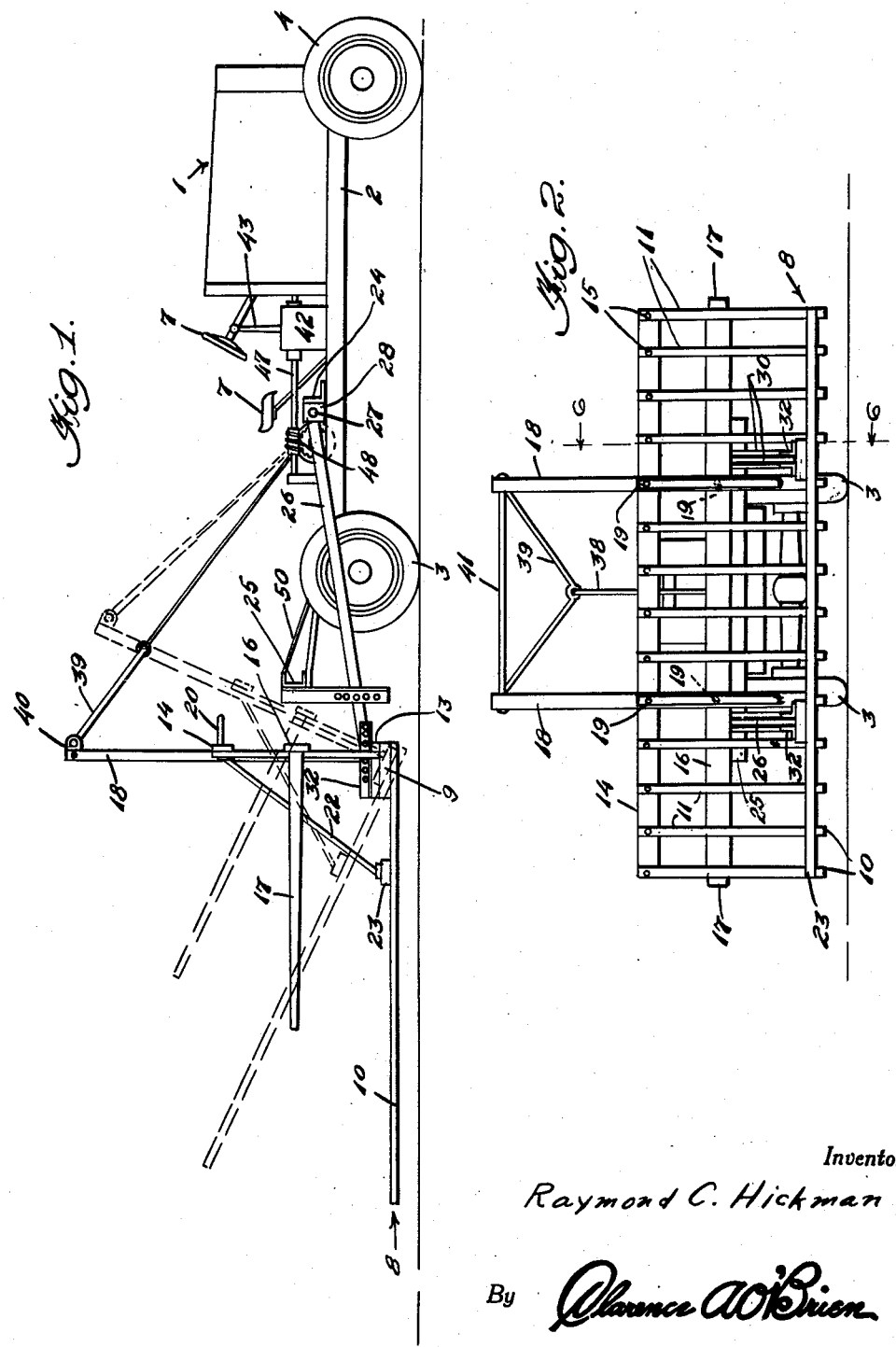

Feb. 3, 1942.    R. C. HICKMAN    2,271,591
POWER RAKE
Filed Sept. 27, 1940    4 Sheets-Sheet 2

Inventor
Raymond C. Hickman
By Clarence A. O'Brien
Attorney

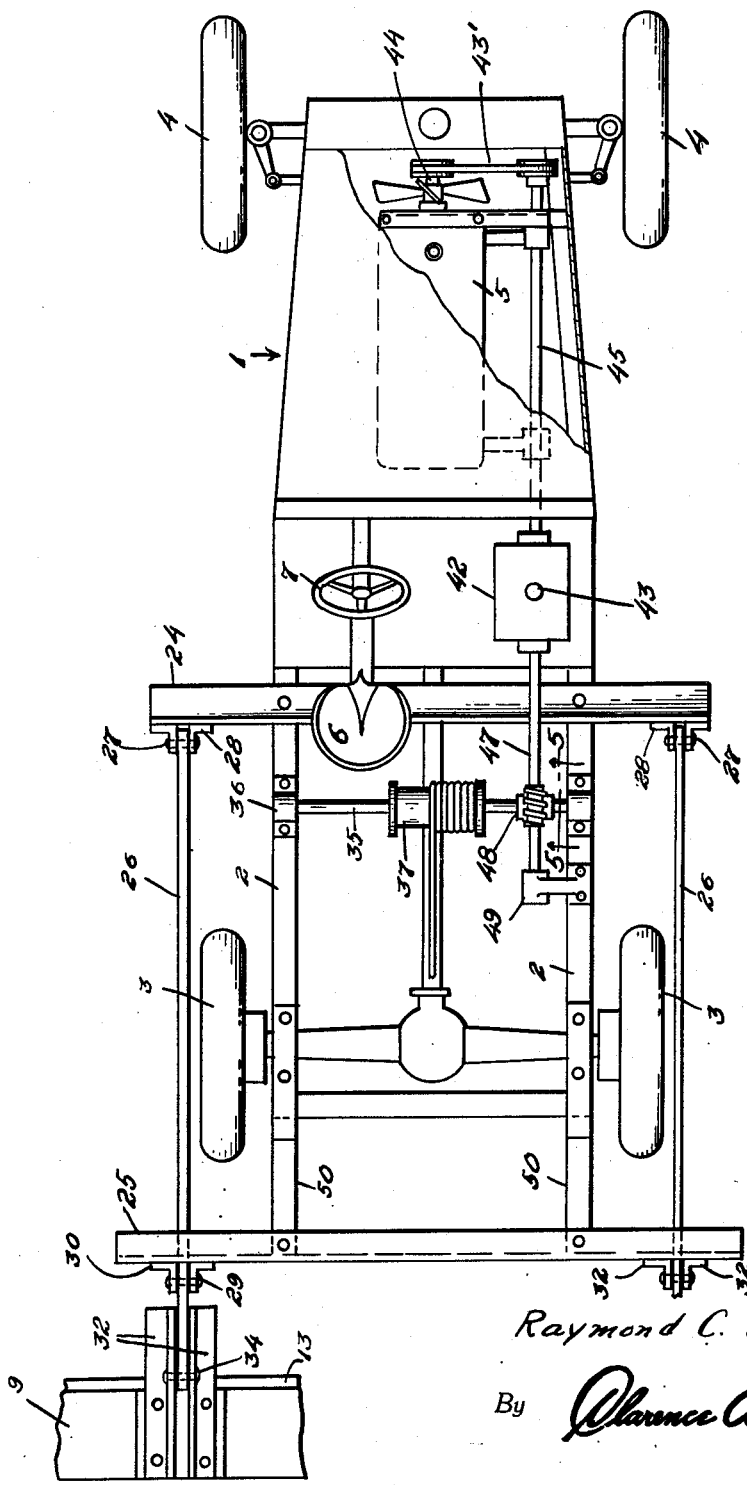

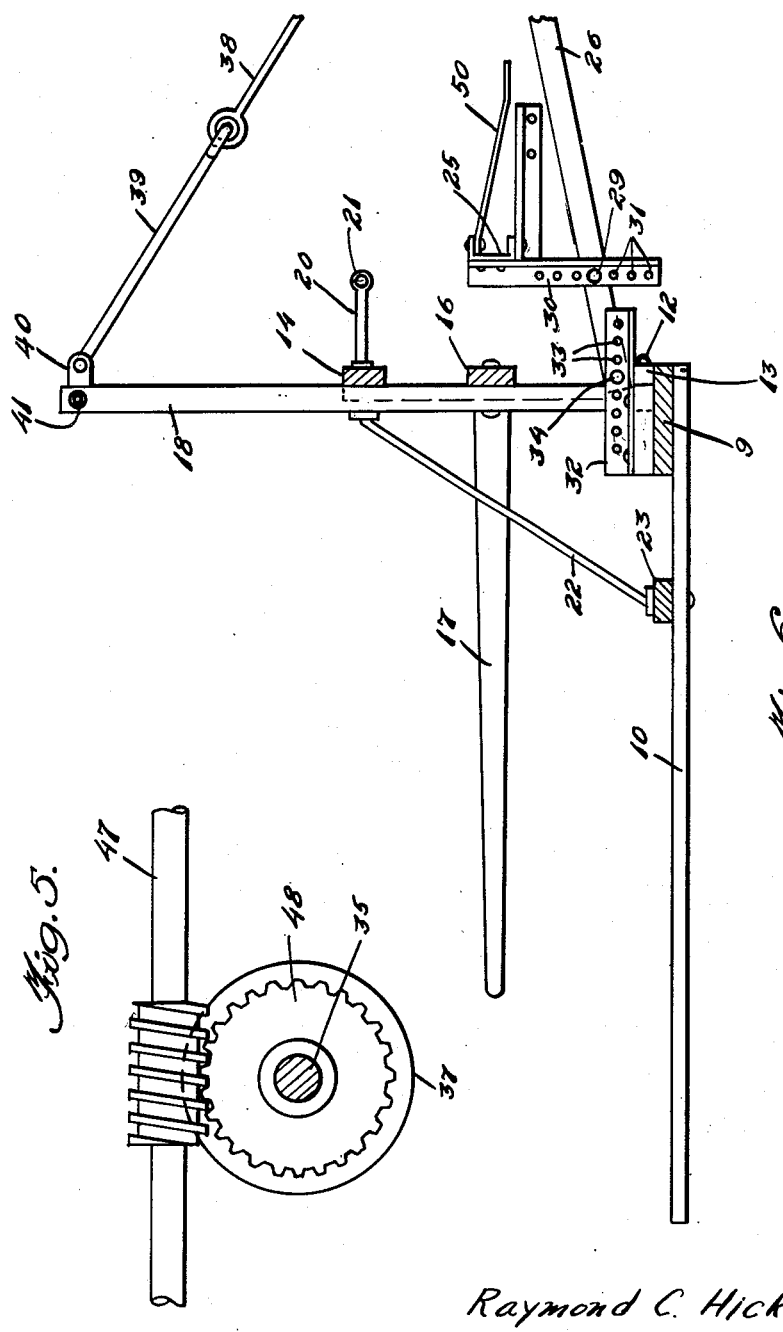

Patented Feb. 3, 1942

2,271,591

UNITED STATES PATENT OFFICE 2,271,591

POWER RAKE

Raymond C. Hickman, Warren, Minn.

Application September 27, 1940, Serial No. 358,730

1 Claim. (Cl. 56—27)

My invention relates to improvements in power rakes for use in gathering hay, grain shocks, or in similar capacities.

The principal objects of the invention are to provide a power driven and operated rake of the sweep type which is well adapted to rake and pick up a load and to quickly transport the same to a selected destination, and which is economical and easy to operate, easy to steer, and will carry the load high off the ground.

Other, and subordinate, objects are also comprehended by my invention, all of which, together with the precise nature of my improvements, and the manifold advantages thereof will become readily apparent when the following description and claim are read with reference to the drawings accompanying and forming part of this specification.

In the drawings:

Figure 1 is a view in side elevation of the preferred embodiment of my invention, Figure 2 is a view in rear elevation, Figure 3 is a view in top plan, Figure 4 is a similar fragmentary view drawn to an enlarged scale, Figure 5 is a detail transverse section taken on the line 5—5 of Figure 4, and Figure 6 is a view in section taken on the line 6—6 of Figure 2 and drawn to an enlarged scale.

Referring to the drawings by numerals, in the preferred embodiment of the invention illustrated, the raking elements are mounted on the chassis of an automobile designated generally 1 and which may, with the exceptions presently noted, be of any usual construction. In the present instance, the automobile comprises the usual chassis side bars 2, rear traction wheels 3, front pilot wheels 4, and a power plant including the conventional motor 5. The motor 5 is operatively connected to the rear wheels 3 by the usual means including a transmission, not shown, and having a reverse driving gear. A suitable seat 6 is provided in convenient location to the steering wheel 7.

In the rear of the chassis, and spaced a suitable distance therefrom is a rake 8 comprising a front cross beam 9 extending transversely of the chassis and well beyond both sides of the same, and a plurality of laterally spaced flat tines 10 extending rearwardly and parallel from the under side of said beam with their front ends suitably secured to the under face of the beam. A plurality of uprights 11 extend upwardly from the beam 9 in suitably spaced relation with their lower ends bolted, as at 12, to a cleat 13 extending along the top of the beam 9 adjacent the front side thereof. The upper ends of the uprights 11 are connected together by an upper cross beam 14 bolted thereto, as at 15, and intermediate said cross beam 14 and beam 9 a similar cross beam 16 connects said uprights together. A pair of side bars 17 extend rearwardly from the opposite ends of the intermediate cross beam 16 parallel with the tines 10 above the same. A pair of posts 18 arise from the beam 9 upon opposite sides of the longitudinal center of the rake and intermediate the ends of the beams 9, 14 and 16, and which are suitably bolted, as at 19, to said beams 14, 16, and to the cleat 13. A pair of struts 20 extend forwardly from the posts 18, respectively, through the beam 16 with a brace rod 21 extending through the front ends thereof and having its opposite ends suitably connected to the opposite ends of the beam 14. Brace rods 22 extend rearwardly and downwardly in laterally spaced relation from the beam 14 to a similar beam 23 extending across the tines 10 in the rear of the beam 9, said rods being suitably secured to said beam 9.

As will now be seen, the uprights 11, beams 13, 14 and 16 and the rods 22 form a skeleton stop frame at the front of the rake 8 for preventing hay or other materials being raked from sliding forwardly off the tines 10 and which is well braced for strength and rigidity, the rods 22 similarly bracing the tines 10, and the side bars 17 preventing the material from falling sidewise off said tines.

The described rake 8 is mounted on the automobile 1 by the following means.

Suitably secured to the chassis side bars 2 to extend across the same substantially midway of the chassis is an angle iron beam 24. Similarly extending across the rear ends of the chassis side bars 2, and suitably secured thereto, is a channel iron beam 25. A pair of pusher bars 26 disposed upon opposite sides of the chassis, respectively, to extend rearwardly from the beam 24 are pivotally connected, as at 27, to brackets 28 on said beam so that said bars 26 are vertically swingable on pivots 27.

Adjacent their rear ends, said pusher bars are detachably bolted as at 29, to pairs of hanger bars 30 depending from the angle iron beam 25, said hanger bars 30 being provided with vertically spaced bolt holes 31 therein for selection to adjust the pusher bars 26 vertically into different set positions. The rake 8 is pivotally mounted on the rear ends of the pusher bars 26 for vertical tilting thereon forwardly and rearwardly and by means of pairs of bearing bars 32 surmounting the beam 9 and cleat 12 and suitably secured thereto to extend parallel with said pusher bars, the pusher bars being pivoted between the pairs of bearing bars 32 by pivot bolts 34, and said bearing bars being provided with spaced bolt holes 33 for selection to adjust the rake 8 forwardly and rearwardly on said pusher bars.

Power means is provided for tilting the rake forwardly comprising the following.

A transverse shaft 35 is suitably journalled, at its ends, in bearings 36 on the chassis side bars 2 to extend across said chassis adjacent the angle iron beam 25, said shaft having fast thereon a cable winding drum 37. The drum 37 is adapted, under rotation thereof in opposite directions, to wind thereon and unwind therefrom, respectively, a cable 38 suitably secured at one end thereto. The opposite end of the cable 38 is suitably connected to a rod-like bail 39 extending transversely between the upper ends of posts 18 and having terminal ends pivoted in bearing ears 40 on said posts. A tie rod 41 extends between the tops of the posts 18 to prevent the same from spreading apart and the ends of the bail from pulling out of said ears 40.

A suitable forward and reverse driving transmission 42, with a hand lever control 43, is mounted in any desired manner on the chassis adjacent one side bar 2 thereof for transmitting power from the motor 5 to the cross shaft 35. A belt and pulley drive connection 43' connects the front end of the crank shaft 44 of the motor 5 to the front end of a driven shaft 45 suitably journalled in a bearing 46 to extend rearwardly to the transmission 42. A worm shaft 47 extending rearwardly from the transmission 42 operatively connects the latter to a worm 48 on the cross shaft 35, said worm shaft being suitably journalled in a bearing bracket 49 on one chassis side bar 2.

The channel iron beam 25 is braced to the chassis side bars 2 by brace bars 50.

In the operation of the described invention, the cable 38 is unwound by operation of the drum 37 in the proper direction to relieve tension on the bail 39, under which condition the rake 8 will tilt rearwardly, under the action of gravity, and the tines 10 downwardly. When the rear ends of the tines 10 are in proper position relative to the ground, the automobile 1 is driven in reverse to perform the raking operation. When the desired load has been accumulated on the tines 10 the rake is tilted forwardly to elevate the said tines, as shown by dotted lines in Figure 1, so that the load will not fall off the tines, such tilting, as will be understood, being accomplished by operation of the described power drive to wind up the cable 38 and exert pull on the posts 18. In this position of the rake 8, and tines 10, the load may be carried to the selected destination by driving the apparatus either forwardly or reversely, but preferably forwardly.

Among the many advantages of the described invention, the following are to be noted.

The described raking equipment and power drive therefor may be attached to substantially any automobile chassis without alteration in the basic equipment of the automobile. By driving the rake through the reverse gearing of the automobile ample power is provided for picking up windrows and grain shocks at an appropriate speed. By virtue of the manner in which the rake 8 is mounted, the load may be lifted high and carried as in a basket. The apparatus may be driven forwardly after raking, thus avoiding running over windrows, shocks of hay in the windrows and the like. The loads is carried principally on the rear wheels thus increasing traction efficiency. Other advantages will be manifest.

The foregoing will, it is believed, suffice to impart a clear understanding of my invention without further explanation.

Manifestly the invention as described, is susceptible of modification without departing from the inventive concept, and right is herein reserved to such modifications as fall within the scope of the subjoined claim.

Having described the invention, what I claim is:

The combination with the chassis of an automobile, and the running gear and motor thereof, of a rake at the rear end of the chassis comprising an upright skeleton front, and tines extending rearwardly from said front, means to mount said rake on said chassis for tilting movement forwardly and rearwardly into different inclined positions comprising a pair of pusher bars extending rearwardly from said chassis upon opposite sides thereof, respectively, pairs of angle iron guides at opposite sides of the rake, respectively, straddling said bars, pivotal connections between the rear ends of said bars and said pairs of guides, respectively, means to adjust said bars vertically into different set positions to lift and lower the rake in the different tilted positions thereof comprising pivotal mountings between said bars and said chassis, a pair of hanger bars depending from said chassis alongside said pusher bars, respectively, variable pivotal connections between said pusher and hanger bars for securing the pusher bars to the hanger bars at different levels, and means to tilt said rake under operation of the motor, said first-mentioned pivotal connections being variable to adjust the rake forwardly and rearwardly on said pusher bars.

RAYMOND C. HICKMAN.